(12) United States Patent
Caffier

(10) Patent No.: US 12,240,336 B2
(45) Date of Patent: Mar. 4, 2025

(54) PANTOGRAPH AND RAIL VEHICLE COMPRISING SUCH A PANTOGRAPH

(71) Applicant: Faiveley Transport Tours, Saint-Pierre-des-Corps (FR)

(72) Inventor: Benjamin Caffier, Saint Maure de Touraine (FR)

(73) Assignee: Faiveley Transport Tours, Saint-Pierre-des-Corps (FR)

(*) Notice: Subject to any disclaimer, the term of this patent is extended or adjusted under 35 U.S.C. 154(b) by 90 days.

(21) Appl. No.: 17/310,288

(22) PCT Filed: Jan. 21, 2020

(86) PCT No.: PCT/FR2020/000013
§ 371 (c)(1),
(2) Date: Jul. 27, 2021

(87) PCT Pub. No.: WO2020/157397
PCT Pub. Date: Aug. 6, 2020

(65) Prior Publication Data
US 2022/0134887 A1     May 5, 2022

(30) Foreign Application Priority Data

Jan. 28, 2019 (FR) ........................ 1900728

(51) Int. Cl.
*B60L 5/26* (2006.01)
*B60L 5/22* (2006.01)
*B60L 5/28* (2006.01)

(52) U.S. Cl.
CPC ...... *B60L 5/26* (2013.01); *B60L 5/22* (2013.01); *B60L 5/28* (2013.01); *B60L 2200/26* (2013.01)

(58) Field of Classification Search
CPC ...... B60L 5/00; B60L 5/12; B60L 5/18; B60L 5/22; B60L 5/26; B60L 5/28;
(Continued)

(56) References Cited

U.S. PATENT DOCUMENTS 6,363,862 B1    4/2002   Hazard et al.

FOREIGN PATENT DOCUMENTS

| FR | 3062824 A1 | 8/2018 |
|----|----|----|
| JP | H08275303 A | * 10/1996 |
| JP | H08308013 A | 11/1996 |

OTHER PUBLICATIONS

International Search Report and Written Opinion for corresponding International Application No. PCT/FR2020/000013 (10 pages).
(Continued)

*Primary Examiner* — Zachary L Kuhfuss
*Assistant Examiner* — Heaven R Buffington
(74) *Attorney, Agent, or Firm* — K&L Gates LLP

(57) ABSTRACT

A pantograph includes a chassis, a bow, an articulated arm comprising at least one main rod and at least one auxiliary rod, an aileron assembly comprising at least one aileron which is movable relative to the articulated arm, support means for supporting the movable aileron which are movably mounted on the main rod or the auxiliary rod, means for immobilizing the support means relative to the support rod, and orienting means mounted on the main rod or the auxiliary rod. Over a first range of extension of the articulated arm, the orienting means do not act on the support means such that a characteristic angle of the aileron is substantially constant. Over a second range of extension of the articulated arm, the orienting means act on the support means such that the characteristic angle of the aileron varies continuously.

20 Claims, 10 Drawing Sheets

(58) Field of Classification Search
CPC ... B60L 2200/26; B62D 35/00; B62D 35/001;
B62D 35/002; B62D 35/004; B62D
35/005; B62D 35/007; B62D 35/008;
B62D 35/02; B62D 37/00; B62D 37/02;
B29L 2031/3058; Y02T 10/82
USPC .......................................................... 191/65
See application file for complete search history.

(56) References Cited

OTHER PUBLICATIONS

First Examination Report mailed on Mar. 3, 2022 for corresponding Indian Patent Application No. 202117033389 (4 pages).

* cited by examiner

[Fig. 1]
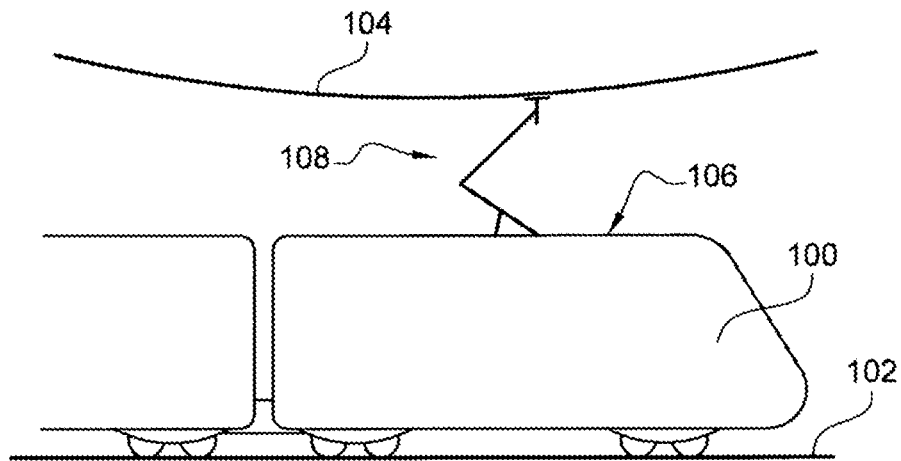
[Fig. 2]
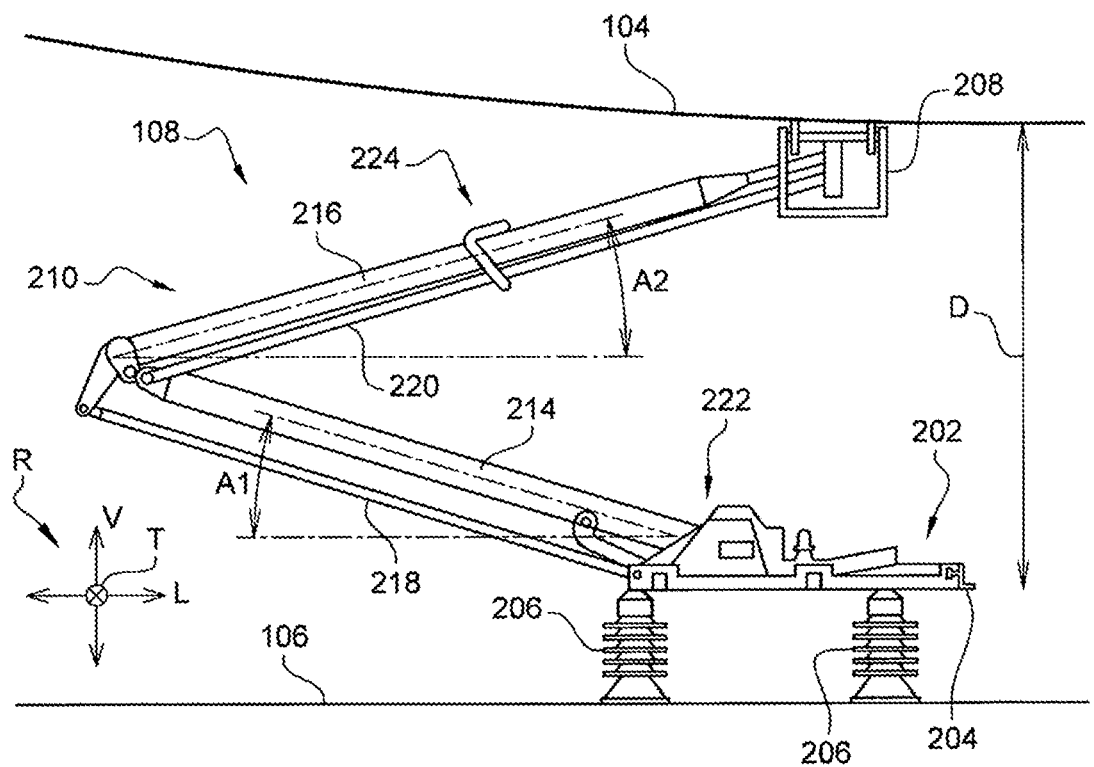

[Fig. 3]
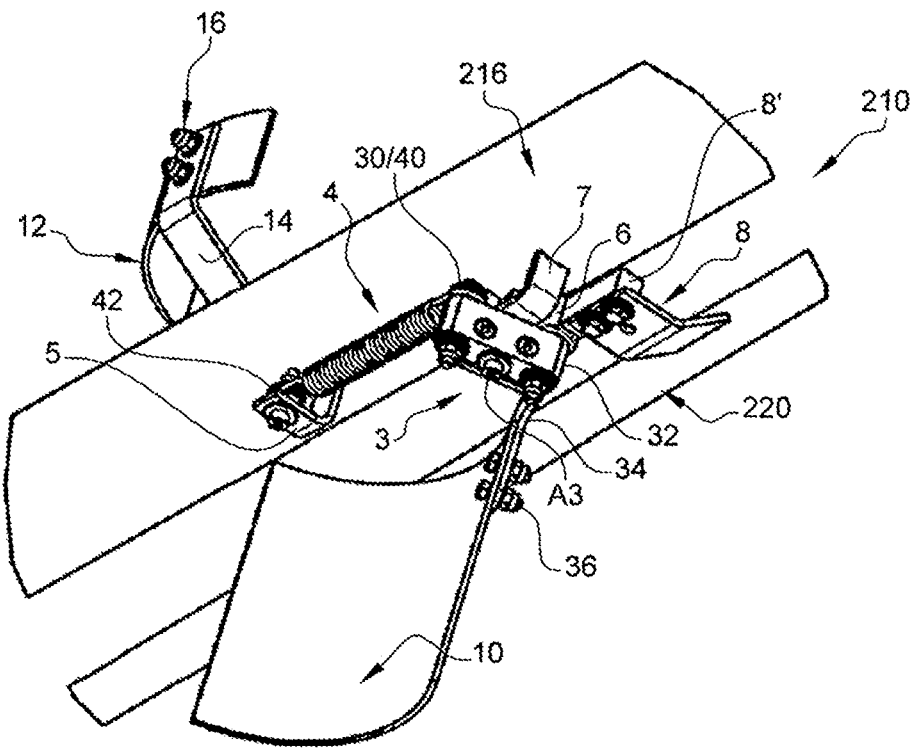
[Fig. 4]
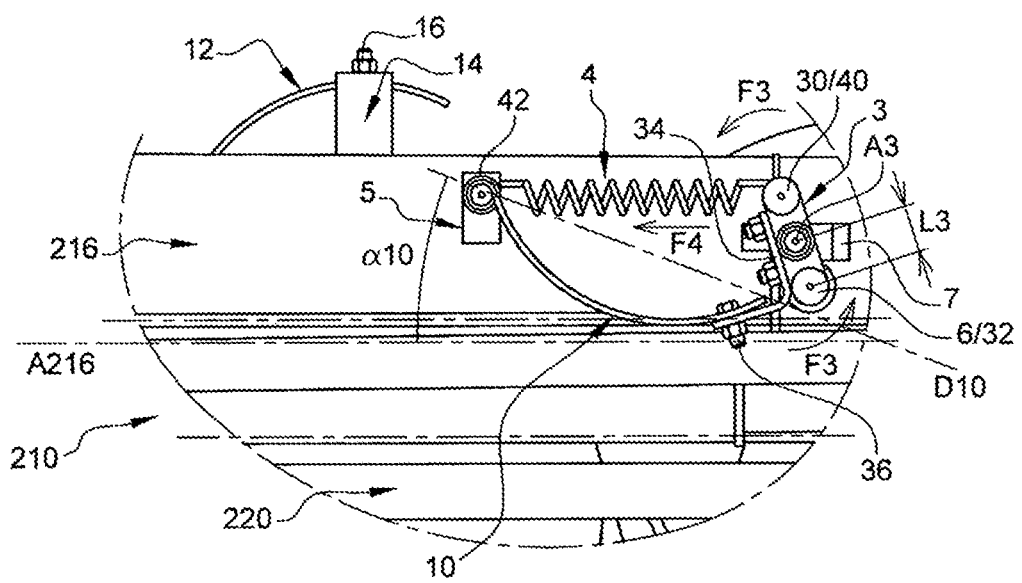

[Fig. 5]
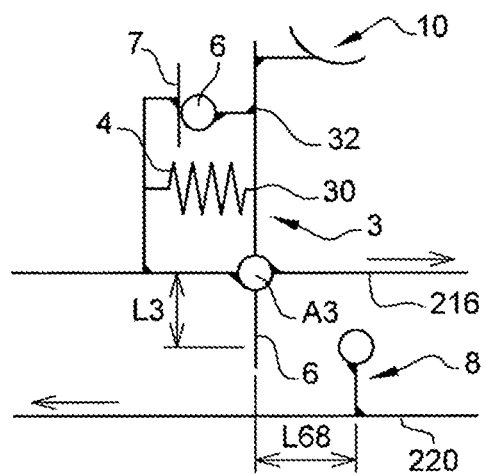
[Fig. 6]
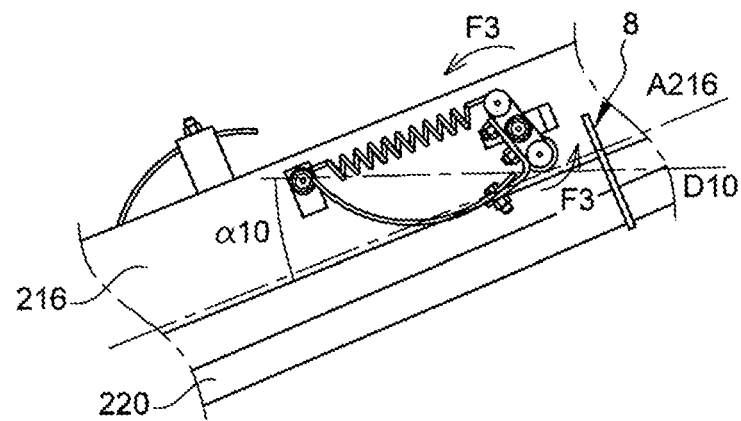

[Fig. 7]
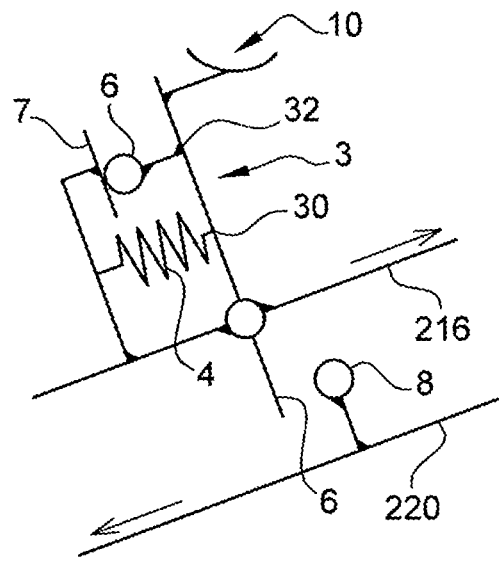
[Fig. 8]
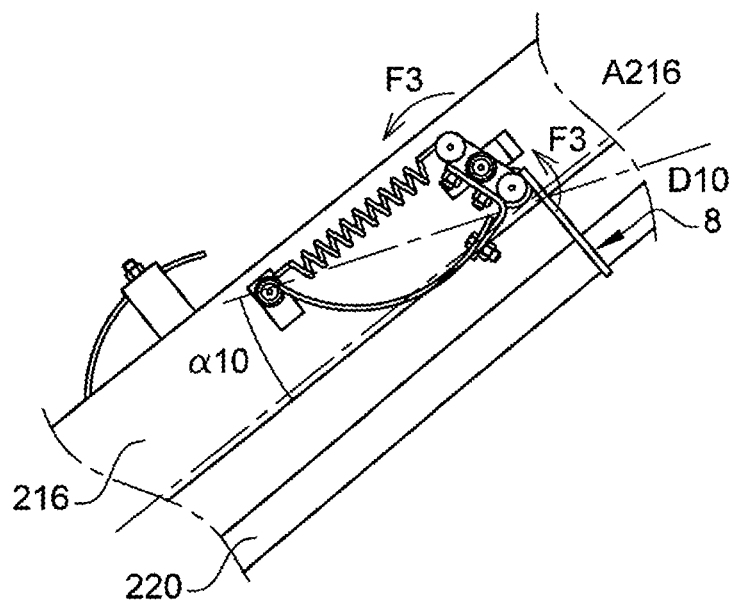

[Fig. 9]
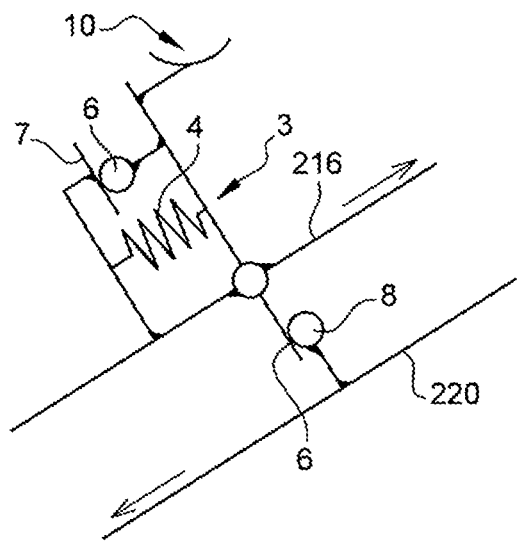
[Fig. 10]
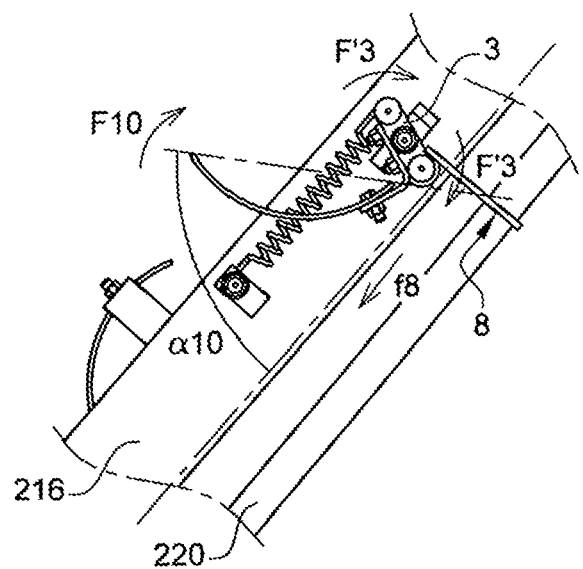

[Fig. 11]
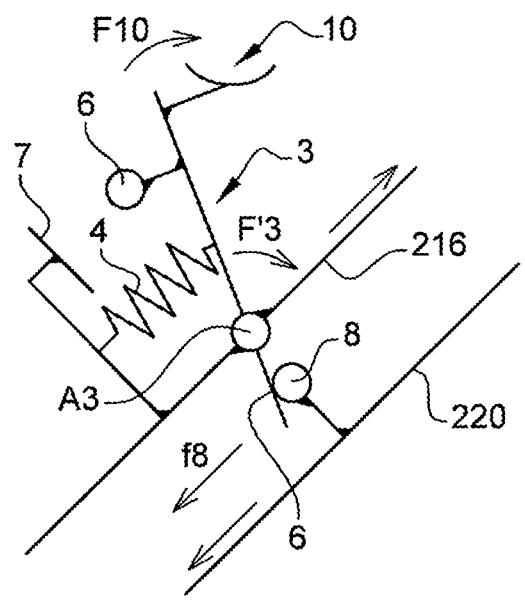
[Fig. 12]
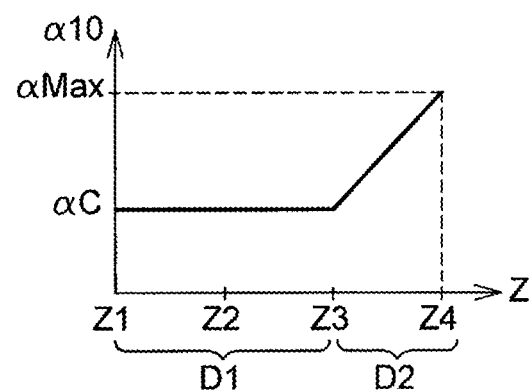

[Fig. 13]
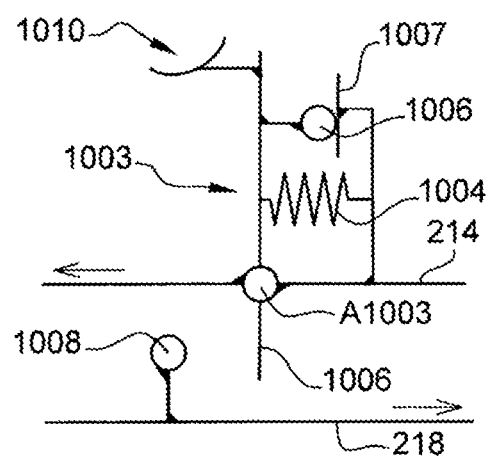
[Fig. 14]
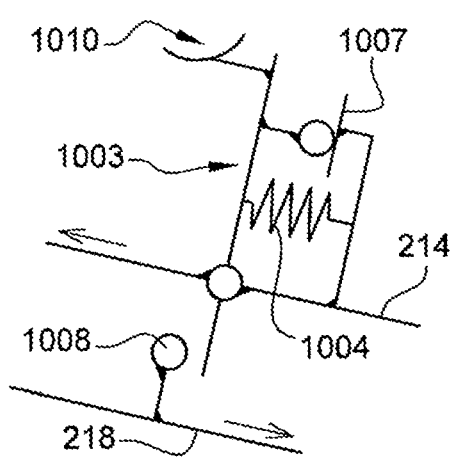

[Fig. 15]
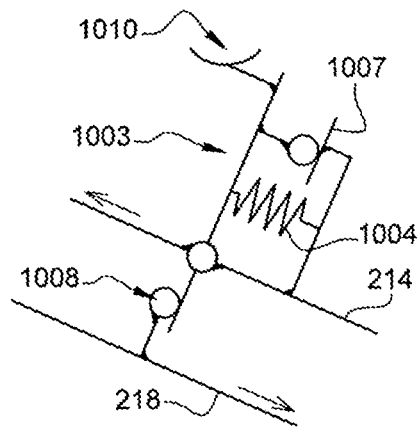
[Fig. 16]
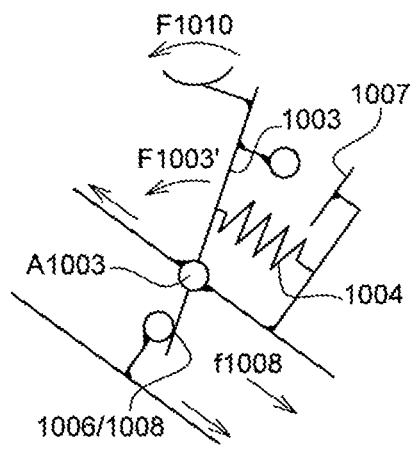
[Fig. 17]
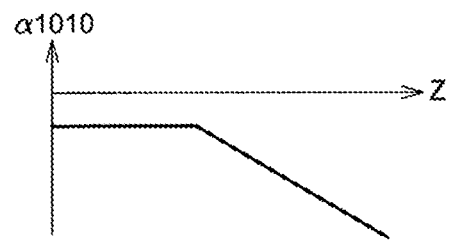

[Fig. 18]
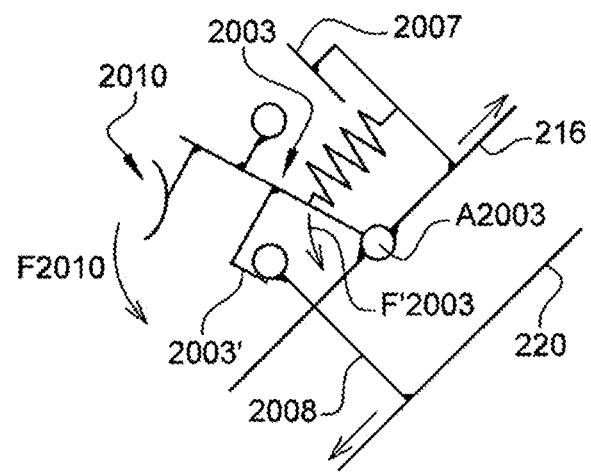
[Fig. 19]
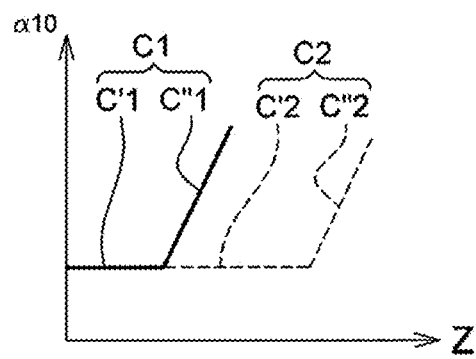
[Fig. 20]
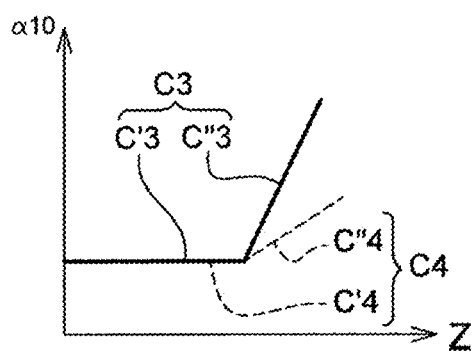

[Fig. 21]
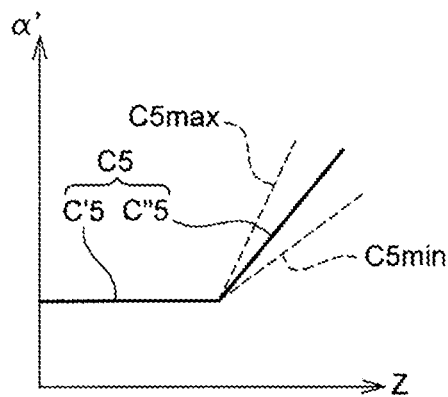
[Fig. 22]
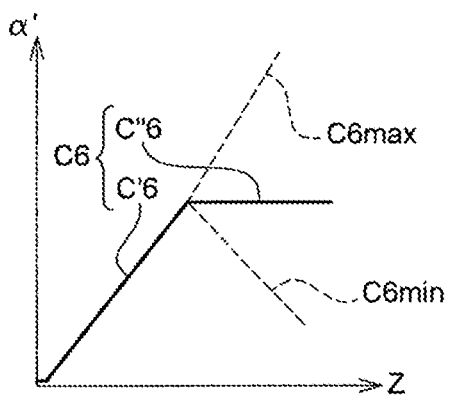

PANTOGRAPH AND RAIL VEHICLE COMPRISING SUCH A PANTOGRAPH

CROSS-REFERENCE TO RELATED APPLICATIONS

This application is a national stage entry of and claims priority to international patent application no. PCT/FR2020/000013, filed 21 Jan. 2020, which claims priority to French patent application no. 1900728, filed 28 Jan. 2019. The entire contents of these applications are incorporated herein by reference.

BACKGROUND

Technical Field

The inventive subject matter relates to the field of pantographs, in particular for a railway vehicle.

State of the Art

In the case of a rail vehicle with an electric traction motor, pantographs ensure the electrical contact between the traction motor or unit (e.g., a locomotive) and the catenary. For this purpose, the pantograph exerts a pressure force against the catenary which is, in theory, substantially constant. In addition, the pantograph is subject to aerodynamic effects depending on extension of the pantograph (which depends on the height of the catenary in relation to the rail track), depending on the speed of forward travel of the railway vehicle, and depending on the speed of the wind direction. Depending on the case, the aforementioned aerodynamic effects can increase or decrease the pressure effectively exerted by the pantograph against the catenary. For high-speed trains, the aerodynamic effects can be considerable. In general, it is desirable that the pressure exerted by the pantograph against the catenary is independent of the extension of the pantograph, regardless of the speed of the railway vehicle.

It is known that ailerons can be fitted to the pantograph to modify aerodynamic behaviour of the pantograph. As an example, the Japanese patent application published as JP H08308013 A describes a pantograph of the type comprising a chassis, a bow to be in contact with a catenary to pick up a supply current passing through the catenary, an articulated arm connecting the bow to the chassis and designed to extend vertically to move the bow vertically with respect to the chassis, at least one aileron, and an aileron orienting device. The latter is designed to vary the angle of the aileron with the longitudinal direction as a function of the deployment of the articulated arm, by means of a control member, articulated both on the upper main rod and on the upper auxiliary rod of the arm.

In this known pantograph, the orienting device is designed to gradually increase the angle of the aileron as the articulated arm is deployed, from a negative value relative to the horizontal to a positive value relative to the horizontal. When the angle is negative, the aileron reduces the pressure of the bow on the catenary, whereas when the angle is positive, the aileron increases the pressure of the bow on the catenary. In this manner, the aileron compensates for the aerodynamic force exerted on the pantograph, this force reducing the pressure of the bow on the catenary more as the elevation of the pantograph is important.

The variation of the angle of the aileron is determined by the length of the sides of a quadrilateral. If the quadrilateral is a parallelogram, there is no variation in the angle regardless of the pantograph elevation. By changing the length of two adjacent sides, it is possible to adjust the variation of the angle. This invention is well suited to most situations, when the height of the catenary remains within a limited range, in areas where the train can run at high speeds, where the aerodynamic force is elevated. On the other hand, when the pantograph is required to operate at a high speed over a wide range of extensions, the device does not offer enough possibilities for variation of the angle of the aileron to compensate the aerodynamic force most accurately.

This type of situation occurs, for example, when the pantograph extension increases. Traditionally, pantographs are designed for an extension that varies between about 300 millimeters (mm) and about 2,600 mm. For some rail vehicle programs, it is necessary to provide for a higher extension, up to 3,600 mm.

Motorized ailerons can be used to adequately direct the variation of the aileron angle. However, this solution is costly, and brings about a significant increase in weight.

To alleviate the problems associated with the teaching of JP H08308013 A, the applicant, in FR 3 062 824, has proposed an orienting device comprising two separate control members, each of which is articulated on both the main upper rod and the auxiliary upper rod of the arm. Over a first range of extension of the articulated arm, the first control member is capable of controlling the variation of the angle of the aileron independently of the second control member, so as to impart a first angle variation profile to the aileron over this first range. Furthermore, over a second range of extension of the articulated arm, in which the bow moves between the intermediate position and a high position, the second control member is suitable to control the variation of the angle of the aileron, to confer a second angle variation profile to the aileron over this second range. Typically, the first angle variation profile corresponds to a constant value angle, in particular zero. On the other hand, the second angle variation profile corresponds to an angle of increasing value, in particular increasing in a linear manner.

However, this alternative solution presents specific problems. Indeed, the solution implies a relatively complex mechanical structure. Moreover, the aerodynamic effects generated by the variations in the angle of the aileron are not completely satisfactory.

Taking all of that mentioned here above into consideration, the inventive subject matter aims to remedy at least certain of the disadvantages of the prior art presented above.

In particular, the inventive subject matter aims to propose a pantograph equipped with at least one movable aileron, presenting additional aerodynamic effects when compared to those permitted by FR 3 062 824.

It likewise aims to propose such a pantograph, the mechanical structure of which is relatively uncomplicated and whose cost is reasonable.

BRIEF SUMMARY

A first subject matter of the invention is a pantograph (108) that includes chassis (202) to which an index (R) is attached. The index (R) has a longitudinal direction (L), a vertical direction (V), and a transverse direction (T). The longitudinal direction (L) and the vertical direction (V) together define a vertical plane. The pantograph aso includes bow (208) for contacting a catenary (104) to pick up a feed current passing through the catenary (104). The pantograph includes an articulated arm (210) connecting the bow (208) to the chassis (202) and designed to extend vertically to move the bow (208) in a vertical plane relative to the chassis (202). The articulated arm includes at least one main rod (216) and at least one auxiliary rod (220). Each of the main rods and each of the auxiliary rods is substantially parallel and movable relative to each other along a common major axis of the main rod(s) and the auxiliary rod(s). The pantogaraph also includes an aileron assembly having at least one aileron (10) movable with respect to the articulated arm. The pantograph includes support means (3) for supporting the movable aileron (10). The support means is or are mounted in a movable manner on one of either the main rod or the auxiliary rod, called support rod (216). The pantograph also includes a means of immobilization (4, 7) that is suitable to immobilize the support means with respect to the support rod. The pantograph includes orienting means (8) mounted on the other of either the main rod or the auxiliary rod and called an orienting rod (220). The orienting means is or are suitable to move the support means with respect to the support rod against the immobilization means. The orienting means is or are adapted so that, over a first range of extension of the articulated arm (210) in which the bow (208) moves between a lower position and an intermediate position, these orienting means do not act on the support means so that a characteristic angle ($\alpha 10$) of the aileron (formed in the vertical plane by the movable aileron and the main axis (A216) of the support rod) is substantially constant. The orienting means is or are adapted so that, over a second range of extension of the articulated arm (210) (in which the bow (208) moves between the intermediate position and a high position), these orienting means act on the support means so that the characteristic angle of the aileron varies continuously.

Usually, the articulated arm of the pantograph is composed of several sections, typically two in number, each of which comprises a main rod and an auxiliary rod. The two rods of each section are substantially parallel to one another, while remaining movable with respect to each other during the extension of the pantograph, along the main axis of these rods.

In accordance with the inventive subject matter, the movable aileron is mounted on support means, which are provided on one of the rods forming the articulated arm, which is called the support rod. These support means cooperate with immobilization means, which are suitable to immobilize these support means and, consequently, the movable aileron with respect to the support rod.

Moreover, orienting means are provided, which are arranged on the other rod, called the orienting rod, which is substantially parallel to the aforementioned support rod. These orienting means can push the support means against the immobilization means so as to induce a displacement of the mobile element with respect to the support rod.

In accordance with the inventive subject matter, the overall extension of the articulated arm is divided into two ranges, typically one following the other. In a first range, or initial range, the orienting means do not act on the support means, such that the support means are immobilized with respect to the support rod by the immobilization means. Over this first range, the angle that the aileron forms with the main axis of the support rod is substantially constant. In other words, this aileron is overall immobile with respect to this support rod.

Then, in a second or final range, the orienting means now act on the support means. Under these conditions, the support means move in relation to the support rod, against the immobilization means. In this way, the movable aileron also tends to move with respect to this support rod. Consequently, the angle between this aileron and the main axis of this support rod is no longer constant. In the following description, various examples of possible profiles that the inventive subject matter allows to be conferred to this angle, in this second range, will be given.

The inventive subject matter has many advantages over the prior art presented above.

First, it should be noted that it is to the applicant's credit that it has identified the disadvantages associated with the teaching of FR 3 062 824. Indeed, the solution proposed by this document does not allow for a response to situations, in which different profiles of angle variation of the aileron are necessary. In detail, in the first range, the angle profile is not substantially modifiable. Moreover, in the final range, this angle profile is not modifiable to any significant extent.

In the first range of extension of the pantograph according to the inventive subject matter, the angle profile of the movable aileron also is not modifiable. In the final range, however, the inventive subject matter permits modification possibilities that are significantly greater than in the prior art. This advantage will become clearer when reading the description made with reference to FIG. 20 and FIG. 21. In other words, the inventive subject matter improves the solution proposed by FR 3 062 824, by providing other aerodynamic effects exerted on the pantograph.

Furthermore, the inventive subject matter allows a significant simplification of the pantograph structure, in particular compared to the teaching of FR 3 062 824. It will be emphasized that the inventive subject matter makes particular use of orienting means which are advantageously not articulated on the orienting rod. In contrast, it will be recalled that FR 3 062 824 uses several control members that are each articulated on the pantograph arm, which is to say a solution that is significantly more complex from a mechanical standpoint.

According to other features of the inventive subject matter:
- the support means (3) are mounted so as to pivot with respect to the support rod (216), about an axis (A3) transverse to this support rod;
- the support means comprise a support member, in particular a lever (3) that is integral to the movable aileron (10);
- the immobilization means comprise elastic means (4) as well as a stop (7) that is integral to the support rod (216);
- the support means is suitable to come to bear on the stop, under the effect of the elastic means, in the first extension range;
- the orienting means includes an orienting member, in particular a plate (8), fixedly mounted on the orienting rod (220);
- the arm comprises an upper main rod (216) forming said support rod, as well as an upper auxiliary rod (220) forming the orienting rod;
- the substantially constant value ($\alpha c$) of the characteristic angle, over the first extension range, is close to 20°;
- the value ($\alpha$ Max) of the characteristic angle, for a maximum extension of the articulated arm, is close to 60°;
- a fixed aileron (12), which is fixed in relation to the support rod, as well as a movable aileron (10), which is movable in relation to the support rod, are provided; these two ailerons are arranged on opposite lateral sides of this support rod;
- the fixed aileron and the movable aileron have opposite concavities, in particular, the fixed aileron has a concavity facing downwards and the movable aileron has a concavity facing upward;

the orienting means are slidably mounted on the orienting rod; and the support means and/or the orienting means have a length that can be adjusted, in particular by means of a telescoping structure.

According to a second embodiment of the inventive subject matter, a railway vehicle also is proposed. The vehicle includes a roof and a pantograph as described above. The chassis of the pantograph is attached to the roof of the railway vehicle.

DESCRIPTION OF THE FIGURES

The inventive subject atter will hereinafter be described with reference to the attached drawings, which drawings being provided solely by way of non-limiting examples, in which:

FIG. 1 is a profile view of a railway vehicle implementing the inventive subject matter;

FIG. 2 is a side view of a pantograph of the railway vehicle from FIG. 1;

FIG. 3 is a perspective view illustrating more particularly a pressure compensation device of the pantograph from FIG. 2 comprising an aileron system;

FIG. 4 is a profile view of the aileron system and of the device for orienting this aileron system, in a first stage of the extension of the pantograph;

FIG. 5 is a schematic diagram, illustrating the mechanical connections between the various elements of the aileron system and its orienting device, as well as the positioning of these elements during the stage illustrated in FIG. 4;

FIG. 6 is a profile view of the aileron system and the orienting device of this aileron system, during a second stage of the pantograph extension;

FIG. 7 is a schematic diagram, illustrating the mechanical connections between the various elements of the aileron system and its orienting device, as well as the positioning of these elements during the step illustrated in FIG. 6;

FIG. 8 is a profile view of the aileron system and of the orienting device of this aileron system, during a third stage of the pantograph extension;

FIG. 9 is a schematic diagram, illustrating the mechanical connections between the various elements of the aileron system and its orienting device, as well as the positioning of these elements during the stage illustrated in FIG. 8;

FIG. 10 is a profile view of the aileron system and of the orienting device of this aileron system, during a fourth step of the pantograph extension;

FIG. 11 is a schematic diagram, illustrating the mechanical connections between the various elements of the aileron system and its orienting device, as well as the positioning of these elements during the step illustrated in FIG. 10;

FIG. 12 is a graph representing the evolution of a characteristic angle of a movable aileron belonging to the pantograph according to the inventive subject matter, as a function of the extension of the pantograph;

FIG. 13 is a schematic diagram, similar to FIG. 5, illustrating the mechanical connections between the various elements of a pantograph in accordance with an embodiment of the inventive subject matter, during a first stage of extension of this pantograph;

FIG. 14 is a schematic diagram, similar to FIG. 7, illustrating the mechanical connections between the various elements of the pantograph of FIG. 13, during a second stage of extension of the pantograph;

FIG. 15 is a schematic diagram, similar to FIG. 9, illustrating the mechanical connections between the different elements of the pantograph of FIG. 13, in a third stage of extension of the pantograph;

FIG. 16 is a schematic diagram, similar to FIG. 11, illustrating the mechanical connections between the various elements of the pantograph of FIG. 13, in a fourth stage of extension of the pantograph;

FIG. 17 is a graph similar to FIG. 12, illustrating the evolution of the characteristic angle of the movable aileron belonging to the pantograph of FIGS. 13 to 16, as a function of the extension of the pantograph;

FIG. 18 is a schematic diagram, similar to FIG. 16, illustrating the mechanical connections between the various elements of a pantograph according to another embodiment of the inventive subject matter, during the fourth stage of extension of the pantograph;

FIG. 19 is a graph similar to FIG. 12 and FIG. 17, representing the evolution of the characteristic angle of the movable aileron of the pantograph of the inventive subject matter, as a function of the distance separating the support means and the orienting means;

FIG. 20 is a graph similar to FIG. 12, FIG. 17, and FIG. 19, representing the evolution of the characteristic angle of the movable aileron of the pantograph of the invention, as a function of the longitudinal dimension of the support means;

FIG. 21 is a graph illustrating the evolution of the characteristic angle, taken with respect to the horizontal, of a movable aileron fitted to a pantograph according to the prior art; and FIG. 22 is a graph, similar to FIG. 21, representing the evolution of the characteristic angle, taken with respect to the horizontal, of an aileron fitted to a pantograph according to the inventive subject matter.

DETAILED DESCRIPTION

With reference to FIG. 1, a railway vehicle 100 implementing the inventive subject matter will now be described.

The railway vehicle 100 is designed to run on a railway track 102 above which extends a catenary 104 through which an electric supply current passes. The railway vehicle 100 comprises a roof 106 upon which a pantograph 108 is attached, which pantograph is designed to pick up the electrical supply current from the catenary 104 and thus to supply the railway vehicle 100 with electrical power.

With reference to FIG. 2, the pantograph 108 will now be described in more detail.

The pantograph 108 firstly comprises a chassis 202 attached to the roof 106 of the railway vehicle 100. In the described example, the chassis 202 comprises a framework 204 and electrical insulators 206 connecting the framework 204 to the roof 106 of the railway vehicle 100.

An index R is attached to the chassis 202. The index R comprises a longitudinal direction L, a vertical direction V, and a transverse direction T (perpendicular to the plane of the sheet in FIG. 2). The longitudinal direction L and the vertical direction V together define a vertical plane (the plane of the sheet in FIG. 2).

In the example described, the longitudinal direction L corresponds to the usual horizontal direction in the direction of travel of the railway vehicle 100 when the latter travels on a horizontal railway track 102. Furthermore, the vertical direction V corresponds to the usual vertical direction.

In the following description and claims, the terms used relative to positioning will be understood with reference to this index R. In particular, the angles mentioned below will be taken in the vertical plane.

Furthermore, in the following description, a substantially constant angle is an angle that is constant to within 1°.

The pantograph 108 further comprises a bow 208 intended to contact the catenary 104 to pick up the supply current.

The catenary 104 is located vertically at a greatly varying distance from the chassis 202. For example, this distance can vary between 600 mm and 3,600 mm.

To compensate for variations in the distance between the catenary 104 and the chassis 202, the pantograph 108 further comprises an articulated arm 210 connecting the bow 208 to the chassis 202, such that the bow 208 can be at a variable distance D from the chassis 202. The articulated arm 210 is designed to extend vertically to move the bow 208 relative to the chassis 202 for the purpose of maintaining the bow 208 in contact with the catenary 104. In this way, the articulated arm 210 is designed, on the one hand, to expand vertically so as to move the bow 208 away from the chassis 202 as the distance between the catenary 104 and the chassis 202 increases and, on the other hand, fold vertically back into itself to move the bow 208 closer to the chassis 202 as the distance between the catenary 104 and the chassis 202 decreases.

More specifically, in the example described, the articulated arm 210 is in two parts. Thus, it comprises a lower main rod 214 transversely pivotally mounted on the chassis 202 (for example, to the framework 204). The lower main rod 214 is at an angle A1 to the longitudinal direction L. The articulated arm 210 further comprises an upper main rod 216 transversely pivotally mounted on the lower main rod 214 and at an angle A2 to the longitudinal direction L. The bow 208 is transversely pivotally mounted on the upper main rod 216.

The articulated arm 210 further comprises an auxiliary lower rod 218 transversely pivotally mounted on the chassis 202 (e.g., on the framework 204) and on the upper main rod 216, to servo-link the angle A2 of the upper main rod 216 to the angle A1 of the main lower rod 214, such that increasing the angle A1 causes the angle A2 to increase.

The articulated arm 210 further comprises an upper auxiliary rod 220 transversely pivotally mounted on the main lower rod 214 and on the bow 208, such that the bow 208 maintains a substantially constant angle with the longitudinal direction L regardless of the extension of the articulated arm 210.

The pantograph 108 further comprises a restoring mechanism 222 designed to impel the articulated arm 210 to expand. In this way, the bow 208 is maintained in contact with the catenary 104. The restoring mechanism 222 is, for example, designed to rotate the lower main rod 214 to increase the angle A1. The restoring mechanism 222 comprises, for example, an air cushion, a spring, or alternatively an electric motor.

As explained in the introductory part of this description, due to the mechanical construction of the pantograph, the pantograph theoretically ensures a constant pressure on the catenary. However, this pressure is subject to change due to aerodynamic effects.

To regulate the pressure of the bow 208 on the catenary 104 when the articulated arm 210 is highly extended, the pantograph 108 further comprises a pressure compensation device 224 mounted on the articulated arm 210.

With reference to FIG. 3 et seq., the pressure compensation device 224 will now be described in more detail.

With reference to FIG. 3 and FIG. 4, the pressure compensating device first comprises an aileron system, also referred to as an aileron assembly, which in the example described comprises two ailerons 10 and 12, each with a respective concavity facing away from each other. These two ailerons are mounted on the upper main rod 216, as will be described in more detail below. The aileron 12 of these ailerons is fixed with respect to this rod, while the aileron 10 is movable with respect to this same rod.

The fixed aileron 12, shown only partially in the figures, is placed on a first lateral side of the rod 216. The fixed aileron 12 has a concavity turned upwards, which is to say when the articulated arm is horizontal, the ends of this aileron 12 are located below the central part of the fixed aileron 12. This fixed aileron is attached to the rod 216 by any appropriate means. Thus, in the illustrated example, a support 14 integral to this rod is provided, on which support the aileron 12 is fixed in a removable way, in particular by means of a nut and screw system 16.

FIGS. 4 to 11 illustrate in more detail the attachment of the movable aileron 10. The latter, which is placed on the opposite lateral side of the rod 216, has a concavity turned downwards, which is to say opposite to that of the fixed aileron. This movable aileron defines, with the principal axis A216 of the principal upper rod 216, a so-called characteristic angle, which is indicated with $\alpha 10$. By convention this angle is measured between this principal axis and the straight line D10, passing through the opposite free ends of the movable aileron. These figures also illustrate in a more precise way the various mechanical means, which allow for the positioning and the possible setting into motion of the movable aileron.

These means firstly comprise a support member formed by a lever 3, which is pivotally mounted on the rod 216 about an axis A3 extending transversely, which is to say from the back to the front of the sheet. At a first end 30, this lever supports the end 40 of a traction spring 4, the other end 42 of which is mounted on a tab 5 that is integral to rod 216. The other end 32 of the lever supports a roller 6, whose function will be explained in what follows.

This roller is suitable to come to bear against a stop 7, which is permanently mounted on the rod 216. This lever furthermore supports an L-shaped angle piece 34, which allows the attachment of the aileron itself. Advantageously, this attachment is of removable type, such as by using a nut and screw system 36. As will become clearer when reading the rest of the description, the spring 4 and the stop 7 form means of immobilizing the lever 3 and, consequently, the movable aileron.

Furthermore, the auxiliary rod 220 supports a metal plate 8, which is intended to cooperate with the roller 6. This metal plate is attached to this rod 220 by any appropriate means, such as by welding. It should be noted that this plate is not articulated on this rod 220, unlike the lever which is articulated on the rod 216. This plate 8 advantageously has a pusher 8', ensuring better cooperation with the roller 6. This pusher is only shown in FIG. 3, but not in the other figures where the plate is illustrated in a more schematic manner.

FIGS. 4 to 11 illustrate four successive stages of pantograph extension Z. In FIG. 4 and FIG. 5, the articulated arm is substantially horizontal, which is to say it has an extension Z1 equal to 0. In FIG. 6 and FIG. 7, the articulated arm is half raised, so that the pantograph has an extension Z2 of about 1,800 mm. In FIG. 8 and FIG. 9, the articulated arm is raised further, so that the pantograph has a Z3 extension of about 3,000 mm. FIG. 8 and FIG. 9 correspond to a so-called intermediate position, which will be defined in more detail. Finally, in FIG. 10 and FIG. 11, the articulated arm is raised to the maximum, so that the pantograph has an extension Z4 of about 3,500 mm.

In a first range of the extension of the articulated arm, between the positions of FIG. 4 and FIG. 5, on the one hand, and FIG. 8 and FIG. 9, on the other hand, the plate 8 does not cooperate with the roller 6. In other words, this plate does not exert any force on this roller. On the other hand, the compression spring exerts a force F4 which tends to tilt the lever 3 in the direction of arrow F3, whereas this tilting is limited by the presence of the stop 7. Under these conditions, the cooperation between said spring and said stop makes it possible to immobilize the lever with respect to the arm 210, by maintaining this lever in such a way that the lever bears against the stop. Consequently, the aileron is also substantially immobile with respect to the upper arm.

In other words, the characteristic angle of the aileron, which the latter forms with the main axis of the arm, is substantially constant as illustrated in FIG. 12. This means that the variation of this angle is typically less than a few degrees, such as less than 1°. Typically, the ac value of this characteristic angle is around 20° over this first extension range. As mentioned above, FIG. 8 and FIG. 9 illustrate the intermediate position, in which the plate comes to bear against the roller but does not yet exert any significant mechanical action on the latter. In this first range of extension, the orientation of the aileron is controlled solely by the lever 3, which is immobilized by the spring 4 and the stop 7.

Then, if the pantograph continues it extension, the plate 8 tends to push the roller 6 downwards and towards the left of the figure, which is shown by the arrow f8 in FIG. 10 and FIG. 11. Under these conditions, the lever tends to pivot against the action of the spring, which is shown by the arrow F'3. Under these conditions, the aileron also tends to tilt in relation to the upper arm, in the direction of arrow F10. The characteristic angle of the aileron, as defined above, is no longer constant but increases in a substantially linear manner with the extension of the articulated arm, as illustrated in FIG. 12. For a maximum extension of the pantograph, as illustrated in FIG. 10 and FIG. 11, the α Max value of this characteristic angle is typically around 60°. In this second range of extension, the orientation of the aileron is controlled by both the articulated lever 3 and the fixed plate 8.

In the schematic diagrams, which is to say FIG. 5, FIG. 7, FIG. 9, and FIG. 11, the reference 6 is indicated twice. In fact, the roller designated by this reference 6 fulfills a double function, which is to say it comes to rest against the stop 7 and, on the other hand, it is pushed back by the plate 8.

Advantageously, the lower position of FIG. 4 and FIG. 5 and the intermediate position of FIG. 8 and FIG. 9 are separated by a first vertical distance D1 of at least 500 mm, for example between 2,000 mm and 3,000 mm, for example equal to 3,000 mm. Furthermore, this intermediate position and the high position of FIG. 10 and FIG. 11 are separated by a second vertical distance D2 of at least 500 mm, for example between 500 mm and 1,500 mm, for example equal to 500 mm. The variation of the characteristic angle, as a function of the extension of the articulated arm, is illustrated in FIG. 12. The latter also illustrates the successive values of extension Z1 to Z4 as well as the distances D1 and D2, as has been presented above.

In the different positions of FIG. 4, FIG. 6, FIG. 8 and FIG. 10, depending on whether the railway vehicle is moving toward the right or toward the left according to FIG. 1, the effect of the aileron is as follows. An offsetting effect corresponds to a force tending to press the pantograph downwards. A zero effect corresponds to a force significantly lower than the offsetting force, which is to say ten times lower or more.

In the lower position of FIG. 4, the effect of the aileron 10 is offsetting when the train moves towards the right. On the other hand, the aerodynamic effect is zero when the train moves towards the left.

In the half-up position of FIG. 6, the effect of the aileron 10 is zero, both when the train moves towards the right and towards the left.

In the intermediate position of FIG. 8, the effect of the aileron 10 is offsetting when the train moves towards the left. On the other hand, the aerodynamic effect is zero when the train moves towards the right. In other words, this effect is the opposite of the one in the lower position.

Finally, in the high position of FIG. 10, the effect of the aileron 10 is slightly offsetting when the train moves towards the right. On the other hand, the aerodynamic effect is zero when the train moves towards the left.

Thus, in the first range of extension of the articulated arm, found in FIG. 4 to FIG. 8, the two ailerons 10 and 12 are fixed with respect to the upper main rod 216. The compensation device, fitted to the pantograph in accordance with the invention, is then similar to that used in the prior art for adjusting the pressure by means of fixed ailerons over a usual range of extension. Consequently, over this first range of extension, the implementation of the pantograph in accordance with the inventive subject matter, for finding the appropriate orientations of the ailerons, is analogous to that of the prior art. In this way, this implementation is fostered. Beyond this first usual range of extension, namely in the second range of extension of the articulated arm, found in FIG. 8 and FIG. 10, the device for orienting the movable aileron 10 makes it possible to obtain a specific compensation for the large extension values. Moreover, this compensation is easy to adjust, for example by adjusting the length of the lever arm L3.

The inventive subject matter is not limited to the example described and illustrated, with reference to FIG. 3 to FIG. 12.

As a first variant that is not shown, it is possible to reverse the positioning of the support and immobilization means, with respect to the orienting means. In this case, the support means and the immobilization means are placed on the upper auxiliary rod 220, whereas the orienting means are placed on the upper main rod 216. This does not change the variation profile of the characteristic angle.

FIGS. 13 to 17 illustrate another variant, in which the support means, immobilization means and orienting means are mounted on the lower rods of the pantograph. In FIGS. 13 to 17, the mechanical elements, which are similar to those in FIGS. 3 to 12, are assigned the same reference numbers but increased by 1000.

More precisely, the support lever 1003, the tension spring 1004, and the stop 1007 are placed on the main lower rod 214, whereas the orienting plate 1008 is placed on the auxiliary lower rod 218. The means for mounting these mechanical elements on these rods are similar to those which have been described with reference to the above embodiment.

The variation profile of the characteristic angle α1010, thus obtained, is illustrated in FIG. 17. In a first range of the pantograph extension, for which the plate 1008 does not act on the roller 1006, this characteristic angle is substantially constant. Then, as illustrated in FIG. 16, when this plate repels this roller 1006, the aileron 1010 is driven in rotation in the direction of arrow F1010. In this way, the characteristic angle decreases continuously.

FIG. 18 illustrates a further embodiment of the inventive subject matter. In FIG. 18, the mechanical elements, similar to those in FIGS. 3 to 12, are assigned the same reference numbers increased by 2000.

The embodiment of FIG. 18 differs from the first embodiment in that the orienting plate 2008 does not act on the roller 2006 but on a distinct mechanical element, schematically embodied by an edge 2003' of the lever 2003. In these conditions, when this plate repels this edge, the lever as well as the movable aileron are driven in in the direction of rotation F2010, in a direction opposite to that of the first mode of realization.

Other aerodynamic effects can be implemented, for example by modifying the start angle of the movable aileron when the pantograph is in the lower position, by reversing the direction of the concavity of the movable aileron, or by changing the shape of the movable aileron.

The inventive subject matter also is applicable to a pantograph formed by more than two sections, such as three mutually articulated sections. In this case, the support means, immobilization means, and orienting means are mounted on parallel rods, which constitute one of these sections.

FIG. 19 illustrates a further possibility, allowing the profile of the characteristic angle α10 to be varied. For this purpose, it is possible to adjust the distance between the orienting plate 8 and the roller 6 along the main axis of the rods. By increasing this distance, the initial region of the curve, for which the characteristic angle is constant, is lengthened.

In FIG. 5, when the rods are in horizontal position, the distance L68 separating said plate 8 and said roller 6 can be seen. FIG. 19 illustrates a first solid line curve C1, for which this distance is small, as well as a second dotted line curve C2, for which this distance is greater. The first curve has an initial region C'1 of constant value, followed by a final region C"1 of increasing value. Moreover, the second curve has an initial region C'2, the value of which is constant and identical to that of the region C'1, but whose length is greater than that of said region C'1. The curve C2 also has a final region C"2, shifted with respect to region C"1, while having an identical slope.

In this spirit, it is advantageous that plate 8 is mounted in a sliding manner on rod 220, by any appropriate means. For example, it can be provided that this plate is attached to a quill, which can be integrated with the rod in different longitudinal positions. This constructional arrangement is advantageous, in that it allows the variation in a simple manner of the distance L68, as well as the profile of the characteristic angle of the aileron.

FIG. 20 illustrates a further possibility for varying the profile of the characteristic angle α10. For this purpose, it is possible to adjust the lever arm exerted by the pivoting support means. The lever arm, illustrated in FIG. 4 and FIG. 5, corresponds to the distance L3 between the axis of rotation A3 of the lever and the point of support of the plate 8 on this lever. By modifying this length, the slope of the characteristic angle curve can be varied.

FIG. 20 illustrates a first solid line curve C3, for which the lever arm is weak, as well as a second dotted line curve C4, for which this lever arm is greater. These two curves have initial regions C'3 and C'4 which are identical, both in terms of values and length. The initial regions are followed by final regions C"3 and C"4 the slopes of which are different, the slope being greater if the lever arm is weak.

In this spirit it is advantageous that the total length of the lever is adjustable, and/or that the plate is mounted on a support of adjustable length. The adjustable length can be obtained by any appropriate means. For example, it can be provided that the lever and/or the plate support have a telescoping structure. This constructional arrangement is advantageous, in that it allows, in a simple manner, to vary the aforementioned lever arm, as well as the profile of the characteristic angle of the aileron.

FIG. 21 and FIG. 22 illustrate the advantages of the invention, with respect to the teaching of FR 3 062 824 set forth above. These two figures represent the evolution of a characteristic angle of the aileron, as a function of the extension of the pantograph. It is highlighted that, in FIG. 21 and FIG. 22, this characteristic angle α' is different from that illustrated in the preceding figures. Indeed, the angle in FIG. 21 and FIG. 22 is formed, on the one hand, by the straight line D10 connecting the opposite ends of the aileron and, on the other hand, by the horizontal (and not the main axis of the rod as in the previous figures).

In the prior art, illustrated in FIG. 21, the curve C5 of variation of the characteristic angle comprises an initial region C'5 having a constant value, which is followed by a generally increasing final region C"5. For this state-of-the-art pantograph, this characteristic angle has only a small amplitude of adjustment, the amplitude of which is shown by the dotted lines C5 max and C5 min.

As illustrated in FIG. 22, the curve C6 of variation of the characteristic angle according to the invention comprises an initial region C'6 having an increasing value. This is followed by a final region C"6 the profile of which has a much greater amplitude of variation than in the prior art. Indeed, this final region can be increasing, in a substantially constant manner, or even decreasing. As for FIG. 21, this amplitude is embodied by the dotted lines C6 max and C6 min of FIG. 22.

The invention claimed is:

1. A pantograph comprising:
a chassis to which an index is attached, the index having a longitudinal direction, a vertical direction, and a transverse direction, the longitudinal direction and the vertical direction together defining a vertical plane;
a bow configured to contact a catenary to pick up a feed current passing through the catenary;
an articulated arm connecting the bow to the chassis and configured to vertically extend to move the bow in the vertical plane relative to the chassis, the articulated arm comprising at least one main rod and at least one auxiliary rod, each of the at least one main rod and each of the at least one auxiliary rod being substantially parallel and movable relative to each other along a common major axis of the at least one main rod and the at least one auxiliary rod;
an aileron assembly comprising at least one aileron movable with respect to the articulated arm;
means for supporting the at least one aileron, the means for supporting mounted in a movable manner on a first rod of the at least one main rod or the at least one auxiliary rod;
means of immobilization configured to immobilize the means for supporting with respect to the first rod of the at least one main rod or the at least one auxiliary rod;
orienting means mounted on a second rod of the at least one main rod or the at least one auxiliary rod, the orienting means configured to move the means for supporting with respect to the first rod against the means of immobilization, wherein the orienting means is configured so that
over a first range of extension of the articulated arm in which the bow moves between a lower position and an intermediate position, the orienting means do not act on the means for supporting so that a characteristic angle of the at least one aileron that is formed in the vertical plane by the at least one aileron and a main axis of the first rod is substantially constant; and
over a second range of extension of the articulated arm in which the bow moves between the intermediate position and a high position, the orienting means act on the means for supporting so that the characteristic angle of the at least one aileron continuously varies.

2. The pantograph of claim 1, wherein the means for supporting is mounted so as to pivot with respect to the first rod about a second axis oriented transverse to the first rod.

3. The pantograph according to claim 1, wherein the means for supporting comprises a lever that is integral with the at least one aileron.

4. The pantograph according to claim 1, wherein the means of immobilization comprises an elastic means and a stop that is integral to the first rod, the means for supporting configured to come to bear on the stop under an effect of the elastic means in a first extension range.

5. The pantograph according to claim 1, wherein the orienting means comprises a plate fixedly mounted on the second rod.

6. The pantograph according to claim 1, wherein the articulated arm comprises an upper main rod forming the first rod and an upper auxiliary rod forming the second rod.

7. The pantograph according to claim 1, wherein the characteristic angle is substantially constant over the first extension range while the characteristic angle is around 20°.

8. The pantograph according to claim 1, wherein a maximum value of the characteristic angle for a maximum extension of the articulated arm is substantially 60°.

9. The pantograph according to claim 1, wherein the at least one aileron includes a fixed aileron and a movable aileron, the fixed aileron fixed in relation to the first rod, the movable aileron movable in relation to the first rod, the fixed aileron and the movable aileron arranged on opposite lateral sides of the first rod.

10. The pantograph according to claim 9, wherein the fixed aileron and the movable aileron have opposite concavities.

11. The pantograph according to claim 1, wherein the orienting means is slidably mounted on the second rod.

12. The pantograph according to claim 1, wherein one or more of the means for supporting or the orienting means have an adjustable length by a telescoping structure.

13. A railway vehicle comprising:
a roof;
a pantograph according to claim 1, the chassis of the pantograph attached to the roof of the railway vehicle.

14. The pantograph according to claim 13, wherein the articulated arm comprises an upper main rod forming the first rod and an upper auxiliary rod forming the second rod.

15. A pantograph comprising:
an articulated arm configured to be connected to a bow that contacts a catenary, the articulated arm configured to vertically extend to move the bow, the articulated arm including a main rod and an auxiliary rod, each of the main rod and the auxiliary rod movable relative to each other;
an aileron assembly comprising a movable aileron configured to move relative to the articulated arm;
a lever configured to support the movable aileron, the lever mounted in a movable manner on a first rod of the main rod or the auxiliary rod; and
a plate mounted on a second rod of the main rod or the auxiliary rod, the plate configured to not act on the lever while the articulated arm is within a first range of extension in which the bow moves between a lower position and an intermediate position, the plate configured to act on the lever while the articulated arm is within a second range of extension in which the bow moves between the intermediate position and a high position.

16. The pantograph of claim 15, wherein the plate is configured to not act on the lever while the articulated arm is within the first range of extension to maintain an angle between the movable aileron and a main axis of the first rod.

17. The pantograph of claim 15, wherein the plate is configured to act on the lever while the articulated arm is within the second range of extension to vary the angle between the movable aileron and the main axis of the first rod.

18. The pantograph of claim 15, wherein the lever is configured to pivot with respect to the first rod about a second axis that is transverse to the first rod.

19. The pantograph according to claim 15, further comprising:
a fixed aileron fixed in relation to the first rod, the movable aileron movable in relation to the first rod, the fixed aileron and the movable aileron arranged on opposite lateral sides of the first rod.

20. The pantograph according to claim 19, wherein the fixed aileron and the movable aileron have opposite concavities.

* * * * *